Dec. 22, 1970    I. MURRAY    3,549,257
OPTICAL EXTENSOMETER
Filed Dec. 27, 1968
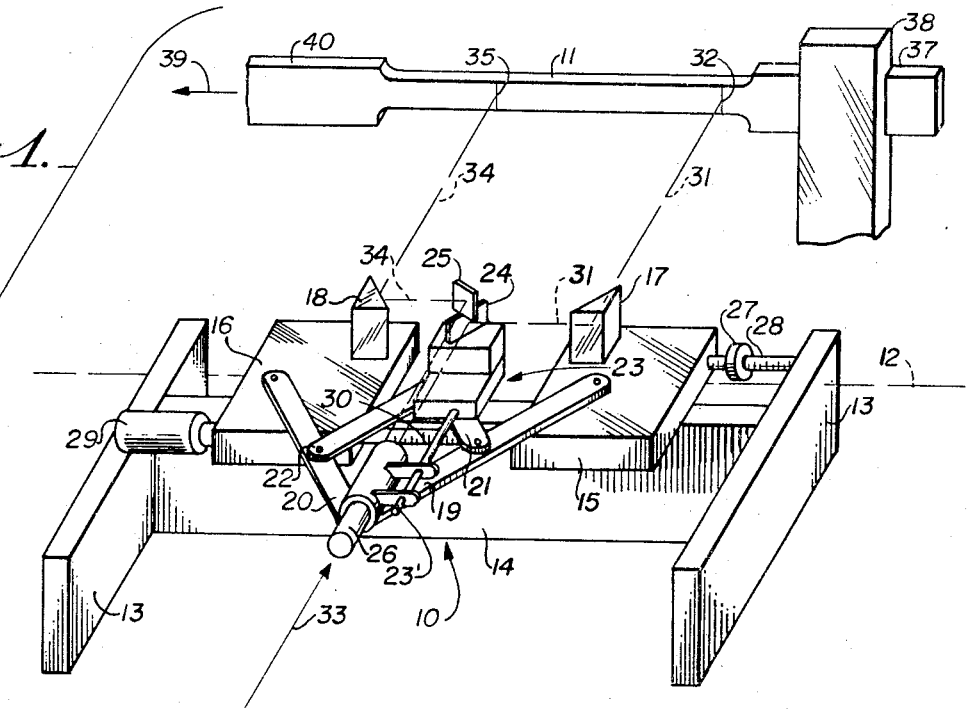
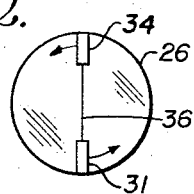
INVENTOR.
IAN MURRAY
BY
ATTORNEY

United States Patent Office 3,549,257
Patented Dec. 22, 1970

3,549,257
OPTICAL EXTENSOMETER
Ian Murray, Livermore, Calif., assignor to the United States of America as represented by the United States Atomic Energy Commission
Filed Dec. 27, 1968, Ser. No. 787,525
Int. Cl. G01b *11/16, 11/02*
U.S. Cl. 356—32    10 Claims

ABSTRACT OF THE DISCLOSURE

An optical device for the measurement of longitudinal changes produced in a test specimen when said specimen is subjected to either compressive or elongative forces. The device employs a single eye piece, positioned above a slide carriage, onto which are projected images of markers inscribed on the specimen. As the specimen is subjected to compressive or elongative forces, the markers and hence the image positions are altered. The amount of change is a measure of, for example, the longitudinal change in the specimen's dimensions. The device provides a low cost, accurate measurement of test materials disposed in vacuum or high temperature environments, while reducing human error and operator fatigue.

BACKGROUND OF THE INVENTION

The invention described herein was made in the course of, or under, Contract No. W-7405-ENG-48, with the United States Atomic Energy Commission.

Previous optical extensometry units of this general type have employed two or more viewing devices mounted independently on an optical slide carriage, the units requiring constant independent readjustment by the operator as the test specimen is stretched or compressed. U.S. Pat. No. 2,050,186 to W. B. Klemperer and U.S. Pat. No. 2,363,964 to A. V. Howson et al are exemplary of these prior art efforts which utilize independent adjustment of the viewing devices

SUMMARY OF THE INVENTION

The present invention overcomes the above discussed limitations of the prior art devices by incorporating two mutually dependent optical systems on one device, thereby permitting the operator to adjust said systems simultaneously and with great facility. The two optical systems and a view telescope are all interconnected by a mechanical linkage which maintains a constant optical distance between viewing telescope and test specimen as elements of the optical systems are moved.

Therefore it is an object of the present invention to provide an extensometer which overcomes the limitations of the prior optical extensometry units.

A further object of the invention is to provide an optical extensometer incorporating two mutually dependent optical systems in one device, thereby permitting the operator to adjust said systems simultaneously.

Another object of the invention is to provide an optical extensometer which eliminates the need for constant eye-piece adjustment on the telescope and the optical systems by interconnecting same through a mechanical linkage which maintains a constant optical distance between viewing telescope and test specimen as the elements of the optical systems are moved.

Other objects of the invention will become readily apparent from the following description and accompanying drawings.

BRIEF DESCRIPTION OF THE DRAWINGS

FIG. 1 is a view illustrating an embodiment of the inventive extensometer with a test specimen disposed in front of and parallel to the longitudinal axis of the extensometer; and FIG. 2 illustrates the test specimen as seen through the viewing telescope of the FIG. 1 device.

DESCRIPTION OF THE INVENTION

As pointed out above, this invention is directed to an optical extensometer used in the measurement of longitudinal displacements produced in a test specimen which is subjected to either compressive or elongative forces. It utilizes two outer mirrors, each disposed at 45° angles to the test specimen and mounted on longitudinally movable blocks, which project the light images of the two test reference marks inscribed on the specimen onto respective inner mirrors each disposed parallel to the aforesaid outer mirrors. The said light images are then reflected from the inner mirrors into a viewing telescope mounted directly behind the said inner mirrors. To eliminate the need for constant eye-piece adjustment on the telescope, the outer mirrors, inner mirrors and viewing telescope are all interconnected by a mechanical linkage which maintains a constant optical distance between viewing telescope and test specimen as the outer mirrors are longitudinally moved.

Before the test force is applied to the specimen, the light images of the test reference marks are aligned one over the other when viewed through the telescope by movement of the outer mirrors. After the test force is applied, the outer mirrors are again moved to realign the reference light images. The differential in distance between outer mirrors before and after realignment as measured by a micrometer attached to the mirror blocks represent the longitudinal displacement of the test specimen.

Referring now to FIG. 1 embodiment, the optical extensometer generally indicated at 10 is shown from an overhead rear position with a test specimen 11 disposed directly in front of and parallel to the longitudinal axis 12 of the extensometer 10. The extensometer comprises an H-shaped support structure having legs 13 and cross member 14, member 14 serving as a machine carriage upon which are slidably mounted a pair of mounting blocks 15 and 16 upon which are secured a pair of outer mirrors 17 and 18, respectively. The mounting blocks 15 and 16 are in turn mutually joined by a mechanical linkage or tong assembly consisting of a first pair of identical outer extensible tong leg members 19 and 20, respectively, and a second pair of identical inner extensible leg members 21 and 22 pivotally mounted at one end thereof on the mid portion of legs 19 and 20, respectively. Leg members 19 and 20 are pivotally connected at one end thereof to mounting blocks 15 and 16, respectively, and are pivotally connected to each other at the ends thereof distal to the ends to which blocks 15 and 16 are attached. The second pair of leg members 21 and 22 are pivotally connected at the opposite ends thereof to the front portion of a mounting block and slide carriage assembly, generally indicated at 23, and upon which a center mirror assembly is mounted which consists of inner mirrors 24 and 25, mirror 25 being located directly above the mirror 24, the mirrors being positioned at a 45° angle with respect to axis 12. A viewing telescope 26 is mounted at the pivot intersection of said outer leg members 19 and 20, telescope 26 being slidably connected with carriage assembly 23 via guide rod 23' to maintain alignment between mirrors 24 and 25 and the telescope 26.

A thumbwheel device 27 is mounted on a threaded shaft 28 intermediate mounting block 15 and the adjacent support structure leg 13, whereupon rotation of thumbwheel 27 will move the viewing apparatus (i.e., mirror mounts, tong leg members, viewing telescope, and center mirror mounting block and slide assembly) along the machine carriage or cross member 14. The mounting blocks 15 and 16 may be movably mounted on carriage 14 by spring biased clamping means or by a tongue and groove arrangement as commonly known in the art.

Situated at the opposite side of the extensometer and mounted on the other support structure leg 13 is a micrometer dial and screw assembly 29 having an indicator member 30 thereof threaded through the mounting block 16 and attached to the mounting block 15. Rotating the micrometer dial assembly 29 will move the mounting block 16 along the carriage 14 while the mounting block 15 remains fixed.

The operation of the inventive extensometer 10 is as follows: Light beam or image indicated at 31 projected from the fiducial line 32 inscribed on test specimen 11 at a first position will strike the first outer mirror 17 mounted on block 15 (the face of mirror 17 being disposed at a 45° angle to the longitudinal axis 12 of the extensometer 10) and be reflected parallel to said longitudinal axis 12. The fiducial image 31 will then impinge on the first inner mirror 24 whose face is disposed parallel to the reflecting surface of mirror 17, and the image is then reflected parallel to a transverse axis 33 of extensometer 10 into the viewing telescope 26 mounted on the axis 33. A similar mode of transmission of image 34 is involved in the reflection of a fiducial inscription 35 located at a second position on the test specimen 11 via the second outer mirror 18 onto the second inner mirror 25 and finally into the viewing telescope 26.

In its non-elongated condition, the inscription images 31 and 34 will be observed in the view telescope 26 to conicide with a vertical crosshair 36 of telescope 26 as shown in FIG. 2. As the test specimen 11 is stretched, the fiducial lines 32 and 35 inscribed on the test specimen will start to move apart causing the fiducial images 31 and 34 to move in opposite horizontal directions as schematically indicated by the arrows in FIG. 2. As illustrated, one end 37 of the test specimen 11 is rigidly positioned in a fixed retainer member 38 while a stretching force indicated by the arrow 39 is applied to the opposite end 40 of the specimen, thereby causing the first calibration image 34 to be displaced in a much greater distance than the opposed calibration image 31.

In order to measure the amount of strain imparted to the test specimen 11, it is necessary to realign the fiducial images 31 and 34 with respect to the vertical crosshair 36 of the viewing telescope 23. This is accomplished by first rotating the thumbwheel device 27 which moves remounting block 15 and mirror 17 until the fiducial image 31 is again observed to coincide with the vertical crosshair 36. Next, the micrometer dial assembly 29 is rotated which moves mounting block 16 and mirror 18 outwardly from axis 33 until the fiducial image 34 is observed to re-coincide with the vertical crosshair 36. The amount of separation imparted to the outer mirror mounting blocks 15 and 16 is exactly equal to the elongation imparted to the test specimen as measured between the incription images 31 and 34, and can be read directly from the indicator member 30 of micrometer dial assembly 29.

It is thus seen that the utilization of the mechanical linkage or tong assembly consisting of the pivotally connected leg member 19, 20, 21 and 22 provides an extensometer which greatly advances the state of the art. This mechanical linkage or tong assembly performs two important functions: first, it maintains the reflecting surfaces of mirrors 17, 18, 24 and 25 at an exact 45° angle to the longitudinal axis 12 of the extensometer 10, this being necessary for precise transmission of the calibration images; second, it establishes substantially constant optical path lengths of images 31 and 34 over extension distances of 0 to 2 inches, for example, thereby eliminating the need for constant readjustment of the viewing telescope 26. The second function can be understood by realizing that as the mechanical assembly 19–22 either expands or contracts the change in separation between the viewing telescope 26 and the two inner mirrors 24 and 25 will be roughly equal to the separation changes between the first inner mirror 24 and the first outer mirror 17 and the second inner mirror 25 and the second outer mirror 18, respectively. If desired, mirrors 24 and 25 may constitute a pair of reflective surfaces formed on the same member.

It has thus been shown that the present invention overcomes the limitations of the prior known extensometry units by elimination of the previous constant independent readjustment of the viewing devices thereof, thereby providing a low cost accurate measurement of test materials while reducing human error and operator fatigue.

Although a specific embodiment of the invention has been illustrated and described, modifications will become apparent to those skilled in the art, and it is intended to cover in the appended claims all such modifications as come within the spirit and scope of the invention.

I claim:

1. An optical extensometer for the measurement of elongational or compressional changes in length imparted to a test body comprising: a support structure including a carriage portion, a first reflecting means slidably affixed to said carriage portion of said support structure and constrained to traverse said carriage portion parallel to a longitudinal axis of said carriage portion to receive a first light beam from an associated test body and reflect same in a direction substantially parallel to said longitudinal axis, a second reflecting means slidably affixed to said carriage portion and constrained to traverse said carriage portion parallel to said longitudinal axis to receive a second light beam from an associated test body and reflect same in a direction substantially parallel to said longitudinal axis and toward said first reflecting means, a linkage assembly composed of a plurality of leg members pivotally interconnected and operatively connected to said first and second reflecting means so as to move said first and second reflecting means along said longitudinal axis of said carriage portion of said support structure upon movement of said linkage assembly, a third reflecting means operatively connected to said linkage assembly and positioned intermediate said first and second reflecting means to receive the reflected light beam from said first reflecting means and reflect same in a direction along an axis substantially perpendicular to said longitudinal axis, a fourth reflecting means operatively connected to said linkage assembly and positioned intermediate said first and second reflecting means to receive the reflected light beam from said second reflecting means and reflect same in a direction along said substantially perpendicular axis, viewing means operatively connected to said linkage assembly and positioned to receive the light reflected by said third and fourth reflecting means along said perpendicular axis, means for simultaneously adjusting the position of each of said reflecting means and said viewing means along said longitudinal axis, and means for adjusting the position of one of said first and second reflecting means relative to the other, said linkage assembly concurrently adjusting the position of said viewing means along the direction of said perpendicular axis.

2. The optical extensometer defined in claim 1, wherein said support structure is of an H-shaped configuration with said carriage portion being incorporated in a cross member which interconnects two leg portions thereof, said first and second reflecting means being respectively secured on a first and second mounting block means, said first and second mounting block means being slidably mounted on said carriage portion of said support structure cross member and pivotally connected to certain of said leg members of said linkage assembly, and said third and fourth reflecting means being fixedly secured on a third mounting block means, said third mounting block means being pivotally connected to other leg members of said linkage assembly.

3. The optical extensometer defined in claim 1, wherein each of said reflecting means includes a reflective surface positioned at substantially a 45° angle with respect to said longitudinal axis of said support structure carriage portion, the reflective surfaces of said first and third reflecting means and the reflective surfaces of second and fourth reflecting means being substantially parallel to one another.

4. The optical extensometer defined in claim 1, wherein said linkage assembly consists of a first pair of leg members pivotally interconnected at one end thereof, a second pair of leg members pivotally interconnected at one end thereof, the other end of each of said second pair of leg members being pivotally connected to approximately the midpoint of one of said first pair of leg members, said third and fourth reflecting means being operatively connected to said pivotally interconnected one end of said second pair of leg members, and said viewing means being operatively connected to said pivotally interconnected one end of said first pair of leg members, each of said leg members of said first pair being operatively connected at the other end thereof to one of said first and second reflecting means, whereby movement of said linkage assembly causes simultaneous movement of said reflecting means and said viewing means along prescribed paths of motion.

5. The optical extensometer defined in claim 4, wherein said first and second reflecting means are respectively secured on a first and second mounting block means, said first and second mounting block means being slidably mounted on said carriage portion of said support structure, said other end of each of said leg members of said first pair being pivotally connected to one of said first and second mounting block means.

6. The optical extensometer defined in claim 5, wherein each of said third and fourth reflecting means is mounted on a third mounting block means, said third mounting block means being pivotally connected to said pivotally interconnected one end of said leg members of said second pair.

7. The optical extensometer defined in claim 1, wherein said simultaneous adjusting means includes a thumbwheel-shaft assembly mounted intermediate said support structure and one of said first and second reflecting means for moving said first and second reflecting means along said longitudinal axis.

8. The optical extensometer defined in claim 1, wherein said adjusting means includes a micrometer dial and screw assembly having an indicator member mounted so as to be operatively connected to one of said first and second reflecting means and operatively connected by a threaded arrangement to the other of said first and second reflecting means, whereby movement of said micrometer dial and screw assembly moves one of said first and second reflecting means with respect to the other, whereupon respective movement of one of said first and second reflecting means adjusts the position of said viewing means along said perpendicular axis.

9. The optical extensometer defined in claim 8, wherein said first and second reflecting means are respectively secured on a first and second mounting block means, said first and second mounting block means being slidably mounted on said carriage portion of said support structure and pivotally connected to certain of said leg members of said linkage assembly, said micrometer dial and screw assembly being mounted intermediate said support structure and one of said first and second mounting block means with said indicator member thereof being threaded through one of said first and second mounting block means and secured to the other of said first and second mounted block means.

10. The optical extensometer defined in claim 1, wherein one of said third and fourth reflecting means is positioned vertically above the other, each of said third and fourth reflecting means having a reflective surface, the reflective surface of one of said third and fourth reflecting means being approximately 90° with respect to the reflective surface of the other of said third and fourth reflecting means.

References Cited

UNITED STATES PATENTS

| | | | |
|---|---|---|---|
| 1,152,171 | 8/1915 | Griffith | 356—15 |
| 2,050,186 | 8/1936 | Klemperer | 356—32 |
| 2,363,964 | 11/1944 | Dowson et al. | 356—32 |
| 3,164,008 | 1/1965 | Nielsen | 356—32 |

WILLIAM L. SIKES, Primary Examiner.

J. ROTHENBERG, Assistant Examiner.

U.S. Cl. X.R.

33—125 (0); 73—88 (0)